Figure 4:
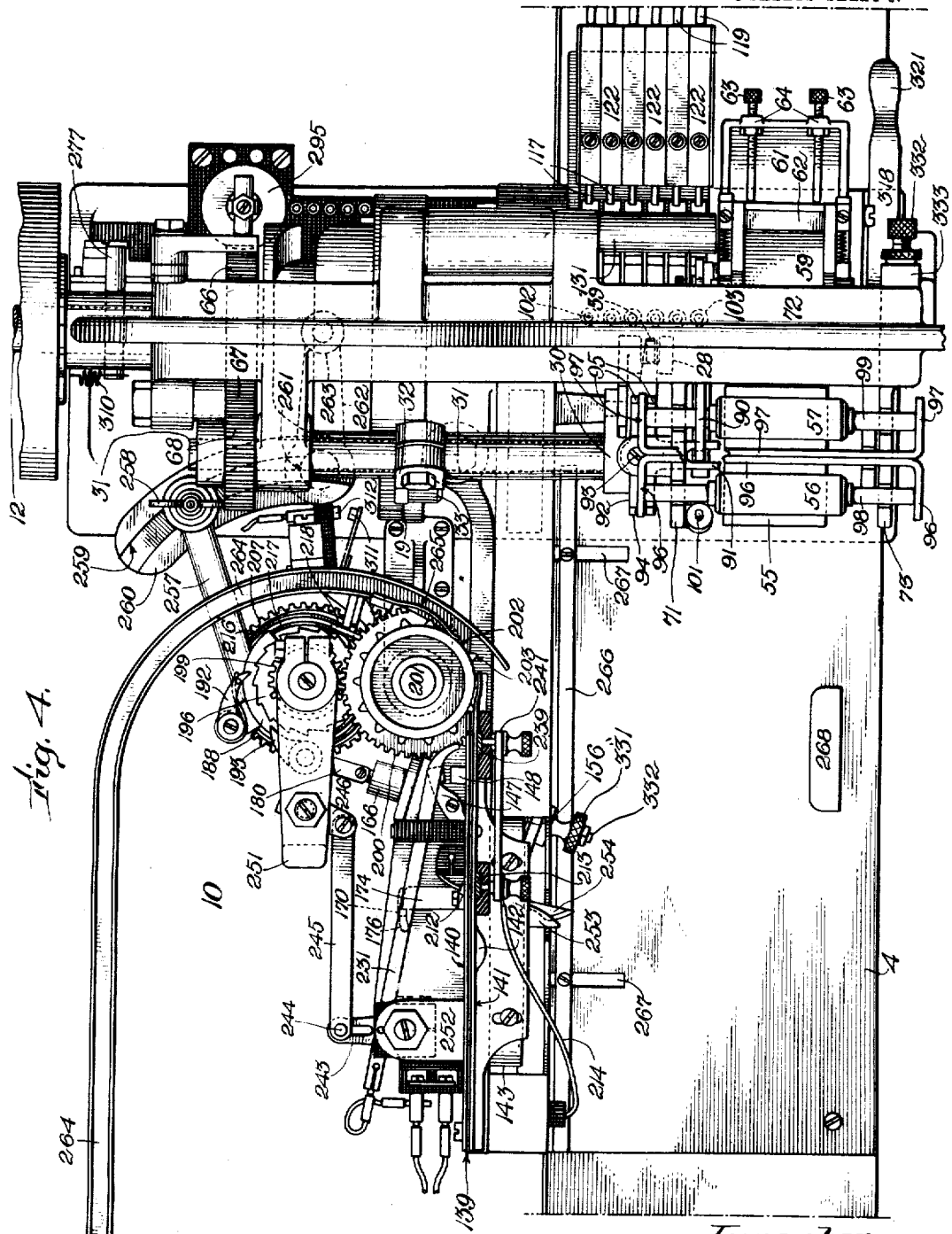

C. H. NICHOLS.
FACTORY TAG OR TICKET MAKING APPARATUS.
APPLICATION FILED JUNE 7, 1909.

1,105,995.

Patented Aug. 4, 1914.

8 SHEETS—SHEET 1.

Witnesses.
Edward Maxwell
M. J. Spalding

Inventor:
Charles H. Nichols
by Geo. H. Maxwell
Attorney.

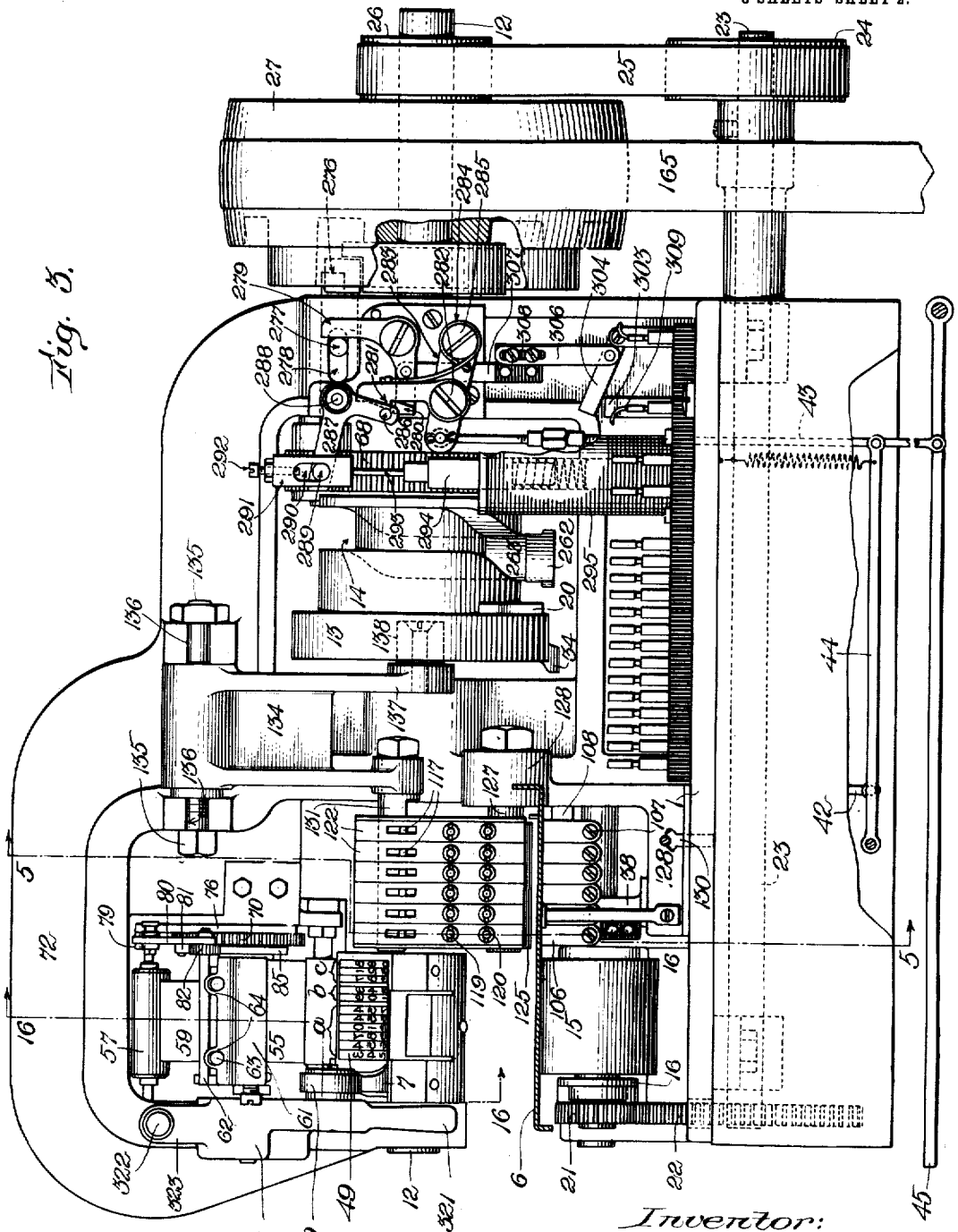

C. H. NICHOLS.
FACTORY TAG OR TICKET MAKING APPARATUS.
APPLICATION FILED JUNE 7, 1909.

1,105,995.

Patented Aug. 4, 1914.
8 SHEETS—SHEET 3.

Witnesses:
Edward Maxwell
M. J. Spaeding

Inventor:
Charles H. Nichols,
by Geo. H. Maxwell,
Attorney.

C. H. NICHOLS.
FACTORY TAG OR TICKET MAKING APPARATUS.
APPLICATION FILED JUNE 7, 1909.
1,105,995.
Patented Aug. 4, 1914.
8 SHEETS—SHEET 5.
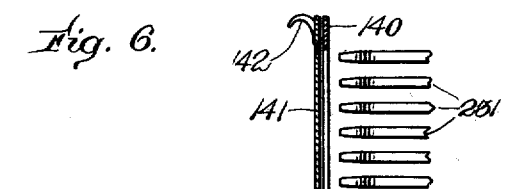
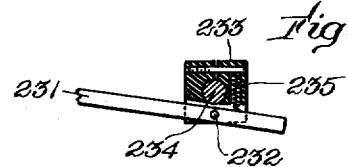
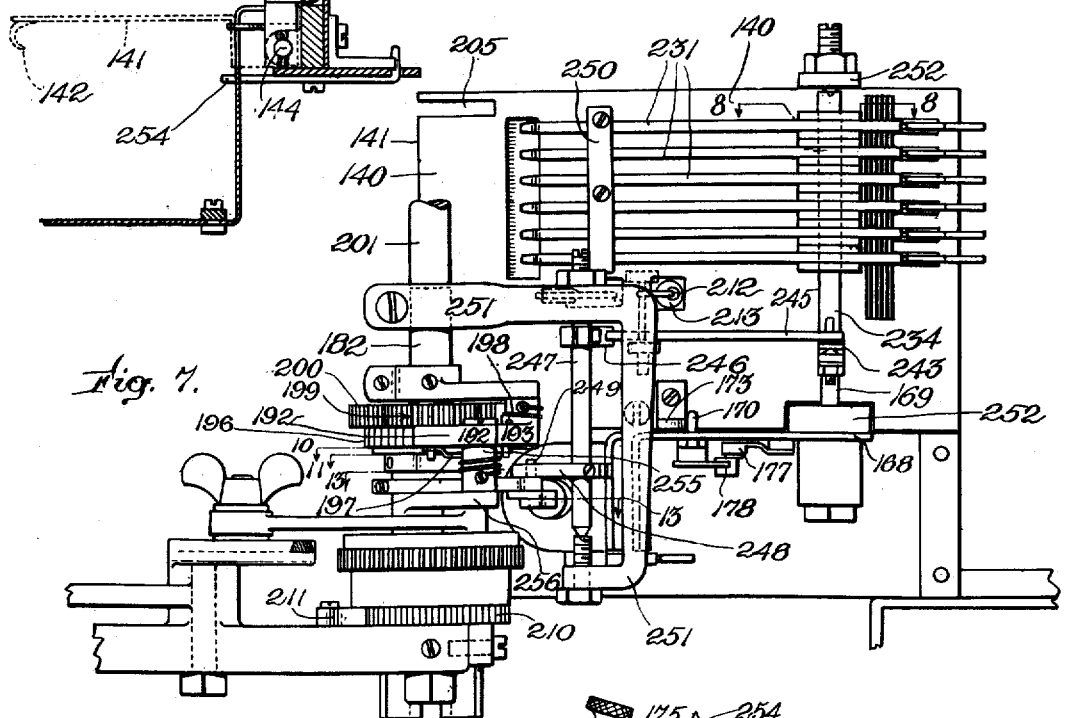
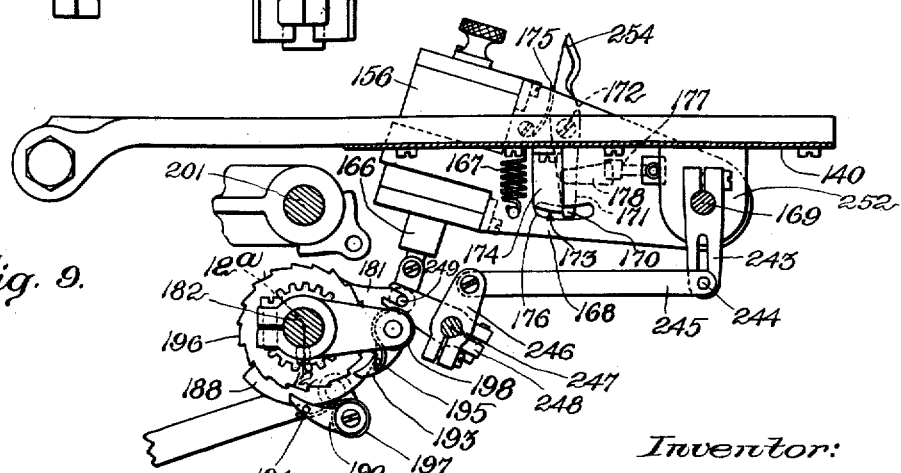
Witnesses:
Edward Maxwell
M. J. Spalding
Inventor:
Charles H. Nichols,
by Geo. H. Maxwell,
Attorney.

C. H. NICHOLS.
FACTORY TAG OR TICKET MAKING APPARATUS.
APPLICATION FILED JUNE 7, 1909.
1,105,995.
Patented Aug. 4, 1914.
8 SHEETS—SHEET 6.
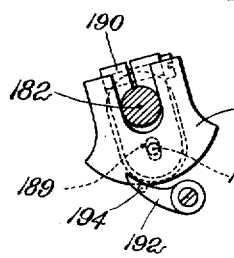
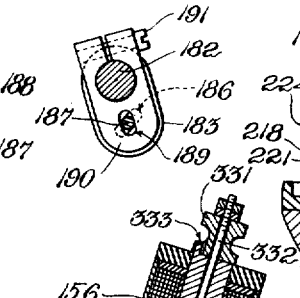
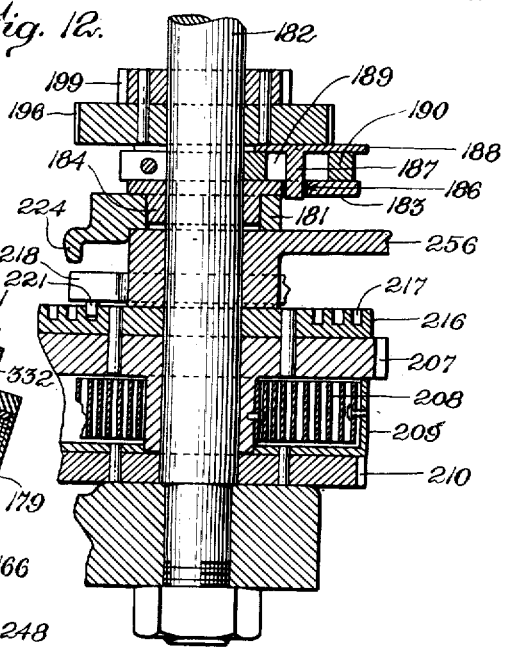
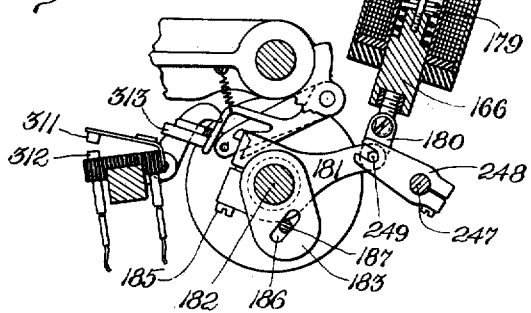
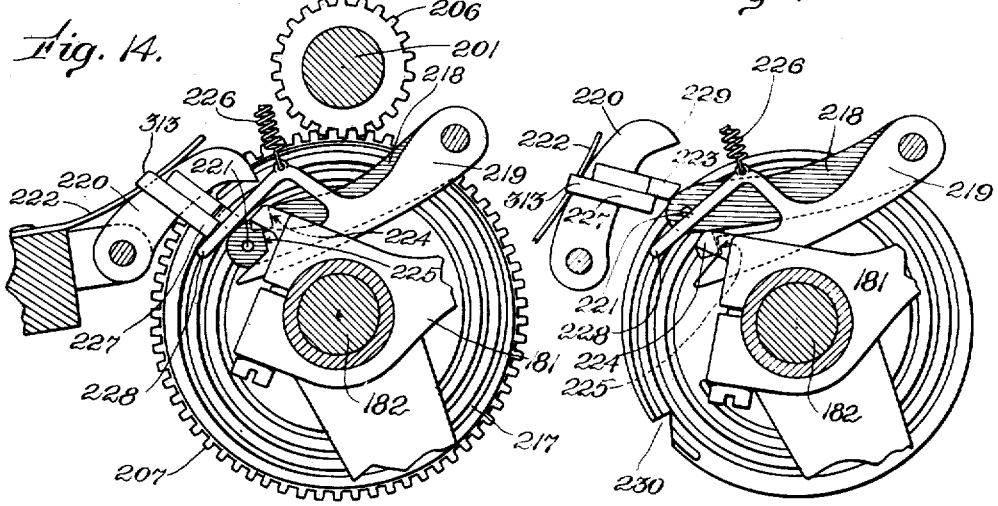
Witnesses:
Edward Maxwell
M. J. Spalding
Inventor:
Charles H. Nichols,
by Geo. H. Maxwell,
Attorney.

C. H. NICHOLS.
FACTORY TAG OR TICKET MAKING APPARATUS.
APPLICATION FILED JUNE 7, 1909.

1,105,995.

Patented Aug. 4, 1914.
8 SHEETS—SHEET 7.

Witnesses:
Edward Maxwell
M. J. Spalding

Inventor:
Charles H. Nichols,
by Geo. H. Maxwell,
Attorney.

C. H. NICHOLS.
FACTORY TAG OR TICKET MAKING APPARATUS.
APPLICATION FILED JUNE 7, 1909.

1,105,995.

Patented Aug. 4, 1914.
8 SHEETS—SHEET 8.

Witnesses:
Edward Maxwell
M. J. Spalding

Inventor:
Charles H. Nichols,
by Geo. H. Maxwell,
Attorney.

UNITED STATES PATENT OFFICE.

CHARLES H. NICHOLS, OF HAVERHILL, MASSACHUSETTS, ASSIGNOR TO AUTOMATIC ACCOUNTING COMPANY, OF BOSTON, MASSACHUSETTS, A CORPORATION OF MASSACHUSETTS.

FACTORY TAG OR TICKET MAKING APPARATUS.

1,105,995.  Specification of Letters Patent.  Patented Aug. 4, 1914.

Application filed June 7, 1909. Serial No. 500,559.

*To all whom it may concern:*

Be it known that I, CHARLES H. NICHOLS, a citizen of the United States, and a resident of Haverhill, in the county of Essex and State of Massachusetts, have invented an Improvement in Factory Tag or Ticket Making Apparatus, of which the following description, in connection with the accompanying drawings, is a specification, like letters on the drawings representing like parts.

In my application Ser. No. 449,447 filed Aug. 20, 1908, I have set forth a card or tag apparatus for following out a cost system, particularly adapted for factory use such as shoe factories, whereby a card, tag, or ticket, is provided with itemized data in a predetermined order and provided also with permanent distinguishing marks having a predetermined arrangement whereby certain related items of said data are arranged conspicuously. My present invention is a machine for automatically making these cards or tags. For instance, shoe factories have what are known as shop orders which inform the departments and employees as to all the particular parts and kinds of material, etc., of a given shoe, price tags (usually of the coupon kind) which indicate the piece price or standard price which each workman is to receive for the work done and which are used for enabling the individual workmen to obtain their pay, and tags which are a combination of both of the above, besides, in some instances, various other special tags. For instance, a combination tag has a number of divisions, one, for instance, relating to linings which contains all the details of linings, another which relates to quarters or tops and contains those details, another relating to outsoles, another to in-soles, vamps, and others to sock linings, lasts, cartons, etc., while another part of the tag contains the price coupons for the workmen to cut off as they accomplish the given work indicated by an individual coupon, said coupons when thus cut off being kept by the workmen and turned in at the office at specified times according to the system of bookkeeping. Sometimes these tags have various other divisions, as, for instance, one division may contain a general description of the entire shoe separate from the above mentioned divisions which relate to details, or portions only of the shoe, and sometimes a tag has a manifold portion, etc. Accordingly, to permit the manufacture of these tags with practical rapidity as wanted at the factory, and in order to make the great variety thereof inexpensively with a single machine, I have devised the hereinafter described mechanism, whereby the tags are printed with such items as may be required, as, for instance, a case number, pairs, sheet number, or anything else, as, for instance, the trademark or other identification of the particular shoe represented by a given tag, and at the same time are punched or are given other distinguishing mark in accordance with a templet or master card.

The machine is so arranged that the printing and the punching take place simultaneously and yet are capable of being operated independently, so that, for instance, the case number, pairs, etc., may be printed at the top of one division where it should occur but once, and yet in another division, as the coupon division, may be printed on each coupon. In the former instance the printing takes place at the head of the division and then stops while the card is moved to another division (which may be a short move or a long move according to the division) and is then printed again, and is then moved it may be to a coupon division, whereupon each coupon is simultaneously printed and also punched.

A further capability of the machine relates to making duplicate tags. For instance, if there are sixty cases of shoes to be made exactly alike there would necessarily be sixty identical tags, and accordingly my machine contains mechanism for automatically running through a tag under the control of a templet so that the tag is automatically printed and punched without the attention of the operator. Preferably the templet is then automatically returned ready to repeat the operation for the next tag, and so on, with great rapidity, until the entire number has been printed and punched. In this connection also, I provide means for changing the case number on each successive tag while the rest of the tag remains the same. A third provision enables the operator to print, and punch if necessary, a portion of the tag by stopping the machine after each operation (as might be required for printing the shop order portion of the tag) and then when the coupon portion of the tag is reached permitting the machine to print and punch automatically and at high speed for such given portion of the tag as desired. In other words, my machine is capable of being operated at the will of the operator or automatically, in accordance with a templet, and is capable of being operated once and then brought automatically to a stop or of being operated automatically for such time as the operator may desire and then brought to a stop, or of being operated automatically until a card or tag is finished and then automatically stopped, or of being operated automatically for a given division and then automatically stopped, to be continued at the will of the operator for the remaining portions of the tag if desired.

The constructional details and further advantages of my invention will appear more fully in the course of the following description taken with reference to the accompanying drawings, in which I have shown a preferred embodiment of a machine for carrying out my invention.

Figure 5:
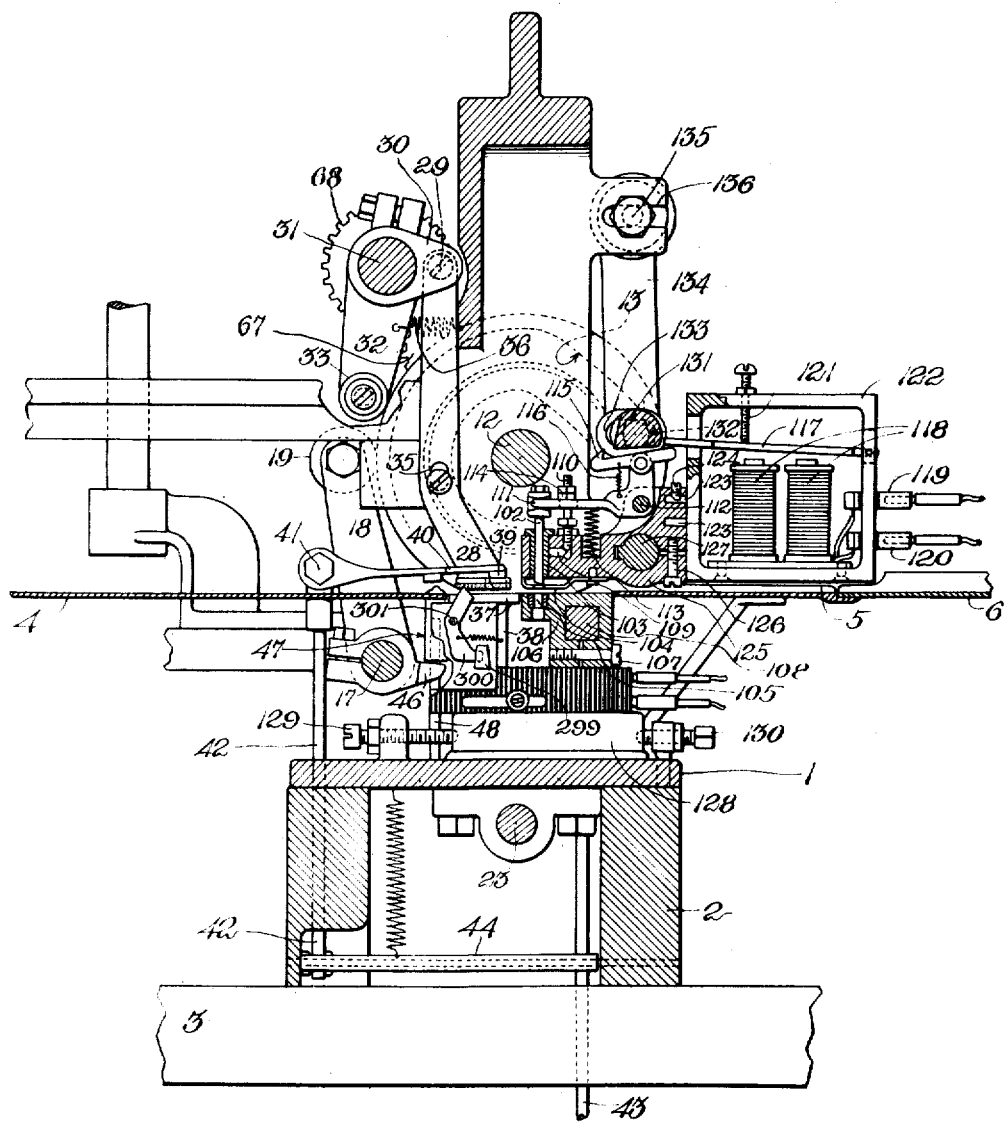
Figure 16:
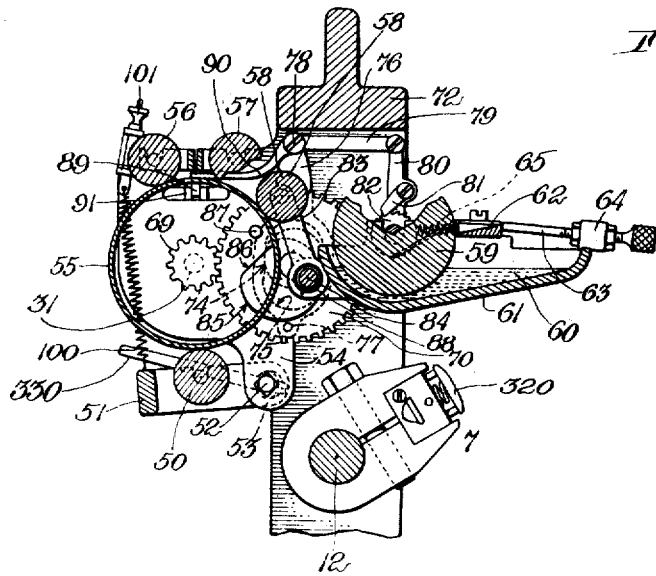
Figure 17:
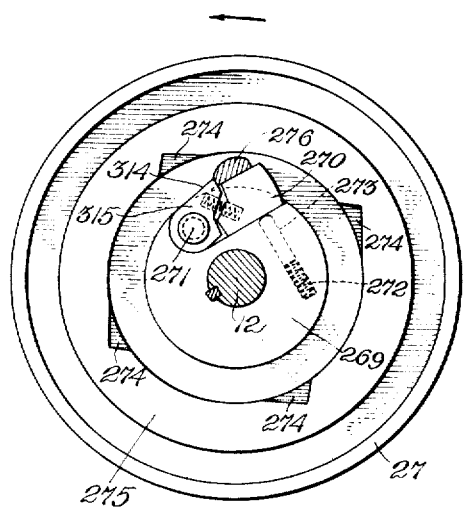
Figure 18:
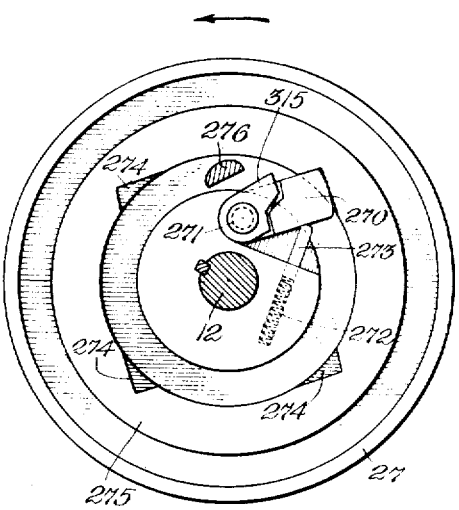
Figure 19:
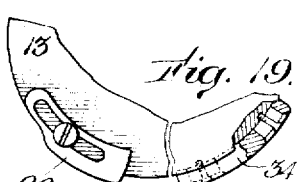
Figure 20:
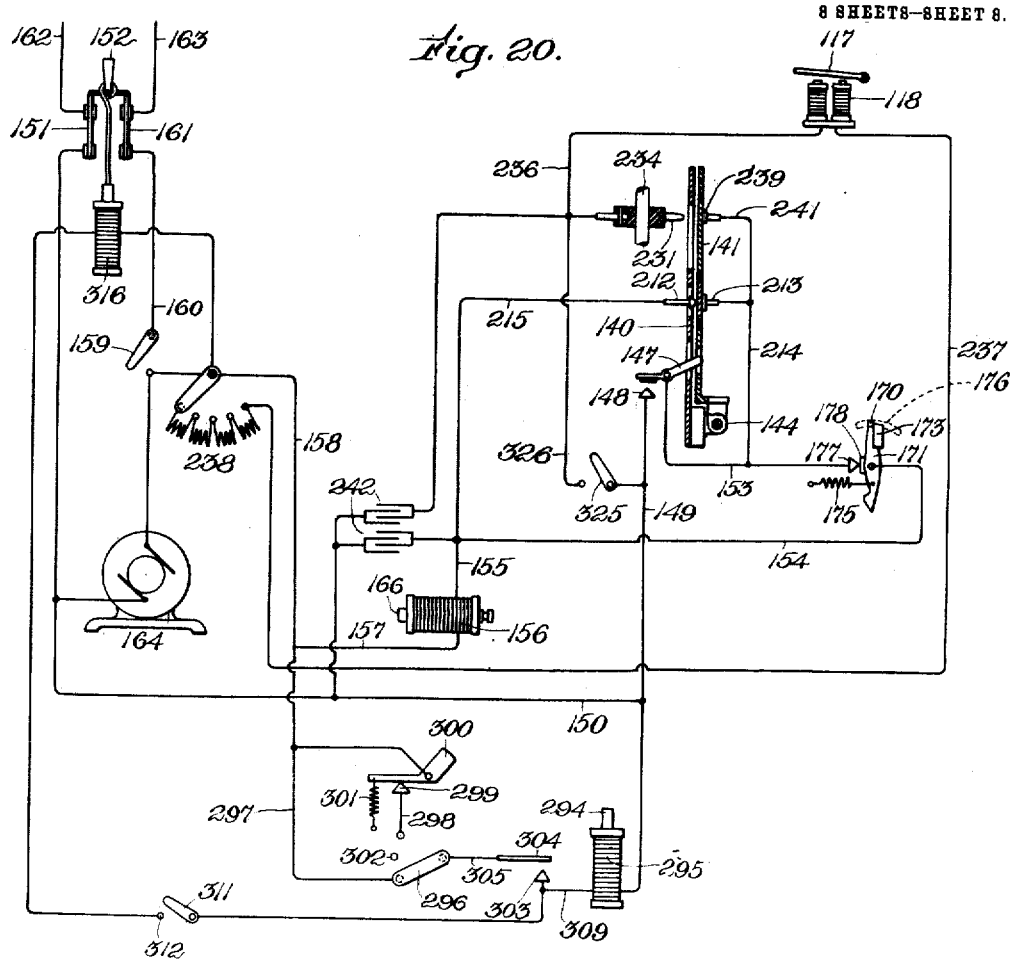
Figure 21:
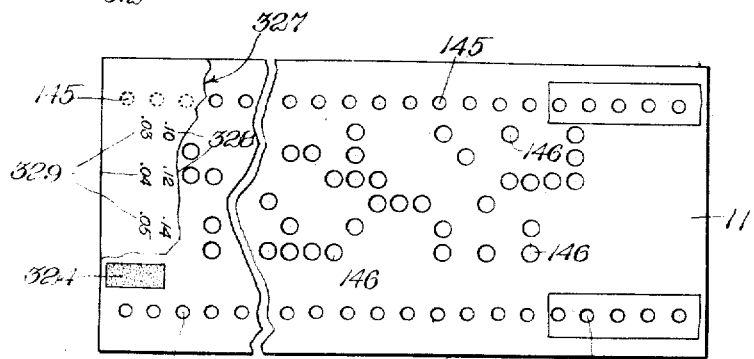

In the drawings, Figure 1 is a view of the machine in front elevation, parts being broken away for convenience; Fig. 2 is a detail in front elevation of the extreme left end of a portion of the releasing mechanism; Fig. 3 is a right-hand end elevation of the machine; Fig. 4 is a top plan view thereof; Fig. 5 is a vertical sectional view taken on the line 5—5 Fig. 3, showing details of the punching mechanism, automatic stopping mechanism, and feeding mechanism; Fig. 6 is a transverse vertical sectional view on the line 6—6 Fig. 1, showing the raceway for the templet and indicating in dotted lines the receiving position of the front wall thereof; Fig. 7 is a view in rear elevation of the templet operating mechanism; Fig. 8 is a horizontal sectional view on the line 8 Fig. 7, showing a detail of the finger operating mechanism; Fig. 9 is a top plan view partly in section, of the mechanism shown in Fig. 7; Figs. 10 and 11 are sectional details on the lines 10 and 11 Fig. 7; Fig. 12 is a vertical sectional view diametrically taken on the diameter 12 Fig. 9 down to part 181 and thence on the bent line 12—12ª Fig. 9; Fig. 13 is a horizontal sectional view on the line 13 Fig. 7; Fig. 14 is a similar sectional view enlarged, omitting the bracket for arm 219 and certain other parts in order to show more clearly the details of the unwinding mechanism, said figure also showing the gearing and spiral in detail; Fig. 15 similarly shows the levers of Fig. 14 in another position; Fig. 16 is a vertical sectional view on the line 16—16 Fig. 3; Figs. 17 and 18 show in front elevation the clutch (its shaft being sectioned) in inoperative and in operative position respectively; Fig. 19 is a detail in elevation showing the adjustable cam member 20; Fig. 20 is a diametric view of the wiring of the machine; and Fig. 21 is a fragmentary view in plan of the templet.

The machine proper is carried on a suitable base 1 supported at 2 on a bench 3. A work table 4, 5, 6, receives and transmits the work beneath a printing mechanism 7 and punching mechanism 8, while above and to the rear of a wall 9 is the templet and templet-operating mechanism 10, the latter being best shown in Fig. 4, the templet being shown in Fig. 21 at 11. Power is derived from a shaft 12 which operates the printing mechanism directly, and operates the punching mechanism through a face cam 13 and operates the templet actuating mechanism through a path cam 14.

It is to be borne in mind that the requirements of the particular work in hand make it essential that the printing and punching shall be extremely accurate, and accordingly, to insure this result, I feed the blank forward intermittingly, bringing the blank to a definite stop for the punching operation but causing it to engage and move forward with the printing mechanism when being printed. To this end, when a card or blank is placed on the table 4 with its front end beneath the printing mechanism 7 it is engaged at the proper moment by a presser roll 15, Figs. 1, 5, carried by a yoke 16 fast on a shaft 17, which is provided at its rear end with a crank 18, Fig. 5, whose cam roll 19 is engaged at the proper time by a cam lump 20, Fig. 3, on the cam 13, which serves to raise the presser roll 15 momentarily into pressing engagement with the card. Said roll is driven by a pinion 21 and gear 22 on a shaft 23, Fig. 1, actuated by any suitable means as by a belt pulley 24 and belt 25 engaged with a pulley or hub 26 fast on the driving pulley 27 of the machine. The remaining parts of the machine are driven through a clutch mechanism from the pulley 27, as presently described. As herein shown, the coöperating means which, in conjunction with the presser roll 15, gives accurate feed, is the printing mechanism 7, which is swung over to the left, Fig. 1, by its shaft 12, and is preferably in approximately vertical position just as the presser roll 15 is raised, so that the forward rotary movement of the roll 15 instantly feeds the paper along and as the surface movement of said roll and the forward movement of the printing mechanism are the same the result is that the printing is effected with extreme accuracy and also the distance that the paper is fed is correspondingly accurate.

To stop the paper positively the moment that it has been fed to the right distance I provide a presser foot 28, Figs. 1, 4, 5, pivoted at 29 on one arm 30 of an elbow lever loosely sleeved on a shaft 31 and having its other arm 32 provided with a cam roll 33 operated by an adjustable lump 34 of the cam 13, Fig. 3, in timed relation to the feeding operation, so that the presser foot positively stops the paper at the instant the feeding movement ceases. The presser foot 28 is guided vertically at 35 and normally held raised by a spring 36 and its lower end coöperates with an anvil or rigid abutment 37, Fig. 5, just beneath the paper, said anvil being supported on a fixed bracket or post 38, Fig. 3. To prevent any accidental movement of the blank and maintain it in position when first placed, I provide a second presser foot or hold-down 39 on the end of a spring arm 40 fast at 41 on the upper end of a treadle rod 42 herein shown as operated in conjunction with the clutch operating treadle rod 43, to which it is connected by an operating lever 44 so that when the treadle 45 is depressed the clutch is operated and also the hold-down 39. To prevent the hold-down 39 from interfering with the feeding movement of the card, I secure to the rock-shaft 17, which operates the presser roll, a bifurcated lever or lug 46, which serves to raise a hollow lifter 47 into engagement with the spring lever 40 so as to spring the hold-down 39 away from the anvil sufficiently to permit the free passage of the blanks whenever the rock-shaft is rocked so as to raise the presser roll to feeding position. The hollow lifter is guided on the upper end of a fixed rod or pin 48.

Any particular kind of printing mechanism may be employed provided it contains a series of relatively movable characters, so as to be capable of coöperating with the rest of the machine in effecting the desired results. As herein shown, the printing mechanism is of the kind containing a series of numbering disks 49 independently rotatable so as to change the case numbers, pairs, and sheet numbers according to the requirements of the successive cards. As the ordinary requirements of a shoe factory demand that the case numbers and the numbers for the pairs and the sheet numbers shall be printed on the cost tickets or tags, I have provided a numbering machine containing three sets of these disks, as indicated by the braces $a$, $b$, $c$, Fig. 3. As the internal mechanism of numbering machines is well known and does not constitute any part of my invention, I have omitted showing the same herein. In Fig. 16 the coöperating parts are shown, consisting of an inking roll 50 loosely journaled in a yoke 51 mounted on an eccentric pin 52 journaled at 53 in a stationary part 54 of the frame. The inking roll coöperates with a series of ink distributing rolls 55, 56, 57, 58, 59, the latter taking the ink 60 from a stationary reservoir 61. A scraper 62 held forward by a rod 63 adjustable at 64 acting in opposition to a spring 65, serves partially to regulate the delivery of ink. Power for these parts is derived from the shaft 31 and gears 66, 67, 68 to a pinion 69 and gear 70, the latter being journaled directly on a web or arm 71 of the frame which, together with the overhanging portion 72 and corresponding web 73, see Fig. 4, supports the printing mechanism. On the gear 70 is an eccentric 74 which operates in the slot 75 of a lever 76 pivoted at 77 to the frame and connected at 78 to a link 79 adjustably pivoted to the upper end of a lever 80 pivoted at its lower end to the axis of the roll 59 and provided with a pawl 81 which engages the teeth of a ratchet 82 fast on said roll 59, so that thereby the roll 59 is ratcheted around by the revolutions of the eccentric 74. The roll 58 is mounted in a frame 83 fast on a shaft 84 to which is secured a cam disk 85 cut away at 86 and engaged at times by a pin 87 on the gear 70, so that each time the gear 70 rotates, the pin 87, by its engagement with the disk 85, rocks the ink-distributing roll 58 from its full-line position Fig. 16 back into contact with the roll 59 from which it receives ink, being then returned by a coiled spring 88 around the shaft 84. To give the distributing rolls 56, 57 a usual endwise movement, the downturned end 89 of an arm 90 carried by the lever 76 engages the forked end 91 of a T-shaped lever 92 pivoted at 93 and carrying at its opposite upturned forked ends at 94, 95, respectively, shifting plates 96, 97 bent at their opposite ends into U shape to overlap the opposite end of the shafts 98, 99 of said distributing rolls 56, 57. Thus when the T-shaped lever 92 is turned on its pivot it causes one of the members 96 to shift longitudinally in one direction and the other member 97 to shift in the opposite direction, thereby correspondingly shifting the ink-distributing rolls. The yoke 51 which carries the ink delivery roll 50 is normally held upward by a spring 100 adjustable at 101, and the position of said roll 50 with relation to the rotating counter or printing device 7 is regulated by the eccentric 52, at 53 so as to deliver more ink or less ink to the type as desired.

The punching mechanism forms an important feature of my invention, whereby not only is the punching exceedingly quick and accurate, thereby permitting the machine to be run at high speed (as is necessary in order to permit the machine to turn out daily all the different tags or tickets required for the usual large shoe factory) but, although very small and compact, it coöperates or responds automatically to the templet or master card which determines the order or arrangement of the punch holes or designations in accordance with the given order, schedule, or list made out at the office for the particular shoe or work for which the tag or ticket is to be punched.

Figs. 3, 4, and 5 best show the details of the punching mechanism, which appears also in Fig. 1. As herein shown I provide six punches and their corresponding actuating mechanisms, said punches being arranged in a straight line transversely of the table or card, so as to punch out, mutilate or otherwise particularly distinguish any one of a series of six items extending transversely of the tag or ticket, as will be better understood from my before mentioned application. It will be understood that it may be preferred to mutilate or punch out five of the said six items, thereby rendering the sixth item conspicuous by not being punched out, or, when the operation designated by any particular coupon is to be omitted, then all six of the items thereon will be simultaneously punched out. On the other hand, some coupons may have but two or three or other less number than the complete six items to select from, and still other variations or requirement may occur, all of which my mechanism is adapted to handle with equal rapidity, accuracy and facility. Referring now to said Figs. 3, 4, and 5, it will be seen that each punch 102 is arranged to reciprocate in a bushing 103 through a stripper plate 104 and a die 105 set into a die holder 106 clamped at 107 to a square transverse rigid stud 108. The bushing 103 is eccentric so as to permit the punch 102 to be shifted into absolutely accurate alinement with the hole in the stripper plate and in the die, being held immovable when once adjusted, by a pin 109 actuated by a set bolt 110. The punch is operated by an elbow lever 111 pivoted at 112 and normally held upward by a spring 113 against a stop 114 on the upper end of the bolt 110. At its opposite end the elbow lever carries a detent 115 pivoted thereon and normally held down at its hooked forward end by a spring 116. At its opposite end the detent 115 is engaged by the forward end of an armature 117 adapted to be contracted by an electromagnet 118 whose terminals are secured to binding posts 119, 120. The sensitiveness of the armature or its normal distance from the electromagnet is regulated by a set screw 121. These parts are carried in a rectangular frame 122 secured by pins 123 and a set screw 124 (above the table sufficiently to permit the cards to pass thereunder) to an arm or bracket 125 clamped at 126 to a spline shaft 127, said arm or bracket 125 supporting the punch and various parts already described. Substantially the same mechanism as above described is provided in connection with each punch, so that the punches and operating parts may be adjusted toward and from each other according to the spacing of the particular tag or ticket. Of course, it will be understood that the number of punches will correspond to the requirements of the given trade (that herein shown being adapted to the usual requirements of the shoe trade).

All the parts of the punching mechanism thus far described are carried by a casting 128 clamped between adjusting screws 129, 130, Fig. 5, so that they may all be removed together for adjustment, inspection, or other purpose. Their adjustment by means of the set screws 129, 130 also permits the punching mechanism to be moved for a long or short feed as desired with relation to the printing mechanism. All the punches are actuated by a common actuator, herein shown as a relatively heavy transverse arm 131 having a reduced end 132 adjustably held in a slot 133 at the lower end of a lever 134 whose pivoted upper end is adjustably held by a bolt 135 in slots 136 in the frame, said lever 134 having a depending end 137 provided with a cam roll 138 traveling in the face cam 13. Thus the lever 134 is constantly oscillated back and forth with each revolution of the machine, thereby actuating at each forward movement all those punches whose magnets have been energized so as to attract their armatures and thereby lift their detents 115 into the path of the swinging arm 131 so as to be engaged thereby, and pulled forward forcibly with their elbow levers 111 which actuate the punches.

In Fig. 21 I have illustrated one form of a typical templet 11 to be used in connection with the controlling mechanism shown in detail in Figs. 1, 4, 6-15. At the back side of the table 4 I provide a templet guide 139 having a stationary back plate 140 set vertically and a movable front plate 141 herein shown as having a handle or thumb lip 142 and hinged at 143, 144 so as to turn down from its full line position Fig. 6 to its dotted line position for the purpose of quickly receiving a templet. The templet has a series of feeding holes 145 at some convenient point, herein shown as adjacent its top and bottom edges respectively, and is provided with the desired controlling holes 146 which serve to control the operation of the punches. As herein shown I depend upon electrical connections, and these holes 146 permit the circuit to be completed by automatic circuit closers. When the templet is put in place and the door or movable part 141 is closed, it thereby swings a switch arm 147 so as to complete the circuit at 148. The wiring is shown in Fig. 20, where it will be seen that conductor wires 149, 150 connect between the contact 148 and one side 151 of the main switch 152, and wires 153, 154, 155 and interposed solenoid 156 and wires 157, 158, switch 159 and wire 160 connect between the contact 147 and the opposite side 161 of said main switch 152, the main or feed wires being indicated at 162, 163. Thus when the starting switch 159 is thrown, thereby actuating the motor 164 to drive the driving belt 165 of the machine, the placing of the templet as explained serves to close the switch 147, 148 by pressing against the tail end of the pivoted part 147, see Fig. 4, thereby energizing the solenoid 156 which causes it to pull in on its core 166. As said core 166, however, cannot move appreciably toward the solenoid, the solenoid moves rearwardly against the action of spring 167, see Fig. 9, carrying with it its supporting member 168 which is pivoted concentrically of 169 until the upturned end 170 of lever 171 which is pivoted at 172 to said supporting member 168 has passed the free end 173 of a fixed arm 174, whereupon said end 170 is suddenly moved to the left Fig. 9 by its spring 175 moving in a slot 176 of 168, thereby breaking the circuit at 177, 178, and deënergizing the solenoid 156. Meanwhile, however, as the core 166 and said solenoid were being pulled toward each other before the breaking of said circuit, a spring 179 within the solenoid, see Fig. 13, was compressed, and the moment the solenoid is deënergized said spring 179 operates to propel the core 166 rearward, the swinging supporting member 168 being then prevented from recovering its original position by reason of the engagement of the hooked up-turned end 170 with the free end of the fixed arm 174. This forcible rearward movement of the core 166 operates to bring into operative engagement a pawl and ratchet mechanism, as will presently be described. Said movement of the core 166 operates through a link 180 to rock an arm 181 loose on a fixed shaft 182 rearwardly, carrying with it a plate 183 whose hub 184, see Fig. 12, is clamped adjustably thereto by a screw 185, Fig. 13. The plate 183 is provided with an oblique slot 186 in which operates a pin 187 depending from a plate 188, see Fig. 10, bifurcated to straddle the shaft 182 and said pin 187 passing through a radial slot 189 in a plate 190 clamped at 191 fast to the shaft 182, the resultant action of said oblique slot 186 and radial slot 189 being to withdraw the plate 188 inwardly each time that the arm 181 is moved rearwardly and to project said plate each time that the arm 181 is pulled forward. This controls the position of two pawls 192 and 193 whose pins 194, 195 rest against the curved outer edge of the sliding plate 188, said pawls normally engaging the teeth of a ratchet wheel 196 when the templet-feeding mechanism is in operation. The pawls are held toward locking position by springs 197, 198, see Figs. 7 and 9. Pinned to the ratchet 196 is a gear 199, which meshes with a gear 200 fast on a shaft 201, to which is secured a drum 202 above said gear 200 provided at its top with feeding pins 203 and at its bottom with similar feeding pins 204. These pins 203, 204, coöperate with the holes 14b of the templet 11 to feed the latter. Both plates or walls 140, 141 are cut away at 205 Fig. 1, for the free movement of said pins, and the front wall extends slightly farther to the right and is preferably curved as shown clearly in Fig. 4, so as to cause the templet to hug in toward the drum for feeding to the best advantage. Fast on the shaft 201 below the gear 200 is a pinion 206, see Fig. 14, in mesh with a gear 207 loose on the shaft 182 which serves to wind a helical spring 208 secured at its inner end to the hub of said gear and at its outer end to a drum or box 209. The tension of this spring is regulated by a ratchet 210 held by a dog 211 or by any other suitable means. This spring serves to reverse the feeding movement of the feeding drum 202 at the end of the feeding operation so as to bring the templet back automatically to its starting position for producing another tag if required, said reverse movement taking place automatically whenever the ratchet 196 is entirely disengaged by its pawls. This disengagement takes place whenever the templet passes beyond a spring contact 212, Fig. 4, which is thereby permitted to close against an opposite stationary contact 213, which completes the circuit from wire 153 to wire 155 by conductors 214, 215, Fig. 20, thereby energizing the solenoid 156 with the result that it pulls in its core 166 and reverses the movement of the plate 188 previously described, so that said plate moves radially outward and pushes said pawls 192, 193, out of engagement with the ratchet wheel 196. As soon as said ratchet wheel is released, the spring 208 instantly reverses the movement of the drum 202, which retracts the templet.

To regulate the distance rearward to which the templet is returned, I provide a member 216 containing a helical track or groove 217 (said member being formed either integrally or fastened immovably upon the gear 207) see Figs. 12, 14 and 15. Coöperating therewith are three pivoted levers 218, 219, 220, the former having a pin 221 traveling in the helical groove 217 so that as the templet is fed forward the lever 218 is moved outward against its spring 222 until it moves the lever 220 from the position Fig. 14 to the position Fig. 15 by engaging a lug 223 thereof. The lever 219 constitutes a locking dog, and overhanging the same is a depending ear 224, see Fig. 12, from the arm 181, and when the core 166 of the solenoid is pulled inwardly the slight movement of the arm 181 caused thereby moves said ear 224 just sufficiently to permit a locking shoulder 225 of said dog 219 under the influence of a spring 226 to drop behind said ear as shown in Fig. 15, so that as long as it is thus held the pawls 192, 193, cannot engage their ratchet wheel. When however the circuit closer 212 closes the circuit and the reverse movement of the templet takes place the corresponding reversal of the helical groove 217 moves the lever 218 gradually inward until an arm 227 of the lever 220 engages a finger 228 of the dis-dog or lever 219. I prefer to secure the disengagement of the shoulder 225 of the dog 219 from behind the ear 224 suddenly, rather than gradually, and accordingly when the lever 220 has been permitted to move inwardly as described, its pointed end 229 engages the periphery of the grooved member 216 (which, it will be borne in mind, is being rapidly rotated in its reverse movement) and at the right instant said pointed end 229 drops into a notch 230 in said periphery and thereby not only takes up the shock of the spring movement and relieves the other parts therefrom, but instantly disengages the dog 219 from the ear 224, thereby permitting the spring 179 of the solenoid 156 to come again into action as before, so that the pawls 192, 193, can engage their ratchet wheel 196 and place the feeding apparatus again in condition for feeding the templet forward. By having the lever 220 in the form of a dog to engage the notch 230 the further advantage is secured of always having the parts at the same initial starting point upon each return of the templet. As the templet is fed forward its holes 146 permit circuit closers to operate to close the circuit, thereby actuating the particular punch or punches required for duplicating in the tag the holes in the templet. To this end I provide a series of contact makers or circuit closers in the form of metal fingers 231, see Figs. 4, 6–8, pivoted at 232 on insulating blocks 233 clamped to a rock-shaft 234 standing vertically at the rear side of the guideway in which the templet travels, a spring 235 permitting said fingers to yield with relation to each other so that they may close the circuit independently of each other according as a hole in the templet comes opposite one or the other, and also so that they may yield for the forward feeding movement of the templet. Each finger has its own independent circuit through the corresponding electromagnet of the punching mechanism, one only thereof being shown in Fig. 20, where it will be seen that from the finger 231-a conductor 236 extends to the magnet 118 and thence a wire 237 leads preferably to a rheostat 238 which connects to the main circuit of the machine at any convenient point as at the starting switch 159. Hence as the templet is fed forward, a punch circuit is closed each time that a hole 146 passes beneath the circuit closing end of the lever 231, so that for instance three punches will first be operated by the templet shown in Fig. 21, and then one punch at the next forward movement of said templet and next three more punches and next two punches and so on, thereby causing the punches to duplicate in the tag the number of holes and their relative positions the same as in the templet. The fixed contact with which the movable contact fingers 231 coöperate is indicated at 239 mounted in an insulating block 240 and connected by a conductor 241 to the wire 214. Preferably condensers 242 are introduced in the circuit of the automatic switches controlled by the templet, to prevent sparking and consequent charring of the templet. To remove the contact fingers 231 from the path of the templet when the latter is to be returned after the completion of its forward movement, I provide a crank 243 extending from the rock-shaft 234 and adjustably connected at 244 to a link 245 which connects to a crank 246 of a shaft 247 which is connected by a second crank 248 to a pin 249 on the free end of the lever or arm 181, see Fig. 13, so that as the arm 181 is moved forward by the core 166, the crank 248 is correspondingly moved thereby, through the shaft 247 and other parts just mentioned, retracting all the contact fingers 231 rearwardly out of the path of movement of the templet. A bar 250 limits their rearward movement. The shaft 247 is supported by a fixed angle arm 251 shown in Fig. 7, and the shaft 234 is similarly supported at its opposite ends in brackets 252.

To permit the solenoid 156 and its support 168 and parts carried thereby to be restored to their original position as shown in Fig. 9, I provide on the front wall or door 141 a lug or tappet 253 and on the arm 171 a projecting beveled tail piece 254, see Figs. 1, 4, 6, and 9, so that when the door or front wall 141 is turned down on its hinges 143, 144, the fixed tappet 253 crowds against the tail piece 254 and thereby swings the lever 171 in opposition to its spring 175 out of engagement with the fixed arm 174, thereby closing the switch 177, 178, and also permitting the spring 167 to swing the parts forward. Thus the machine is left in position to cause the solenoid 156 to be energized whenever a new templet is placed in the machine and the door closed. Simply closing the door without the presence of a templet does not energize the solenoid, as the tail end of circuit closer 147 then remains undisturbed. The feeding of the templet is accomplished by providing the pawl 192 with a reciprocating movement, the pawl 193 serving merely to prevent backward movement of the ratchet after it has been moved forward by the pawl 192. The pawl 192 is mounted on a post 255 at the free end of a lever 256, Figs. 7, 12, loosely mounted on the shaft 182 and actuated by a link 257, Fig. 4, adjustably secured by a thumb nut 258 in a dovetailed groove 259 extending longitudinally of one arm 260 of an elbow lever pivoted at 261, whose opposite arm 262 carries a cam roll 263 engaging the path cam 14 on its under side, see Fig. 3, so that at each revolution of said cam its elbow lever is swung forward and back, thereby ratcheting the feed drum 202 forward step by step. The templet is fed by the feed drum along a curved way or receiving path 264, spring fingers or strippers 265 being provided at the ingoing end of said curved path to strip the templet from the drum and prevent it being carried around improperly by the drum. The timing of the actuating parts is such that when a templet is in position to be fed but is still stationary, the lever 260 is about midway forward to the right, Fig. 4, from its backward position, and the templet is in such position that the contact fingers 231 are held out of circuit-closing position. Thereupon the further forward movement of the actuating lever 260 feeds the templet forward until the hole or holes 146 of the next transverse row are in position to permit the circuit closers 231 to close the circuit through the templet, whereupon the ratchet and its actuating lever start on their backward movement and hence cease to feed, leaving the templet stationary. At the beginning of this halting of the templet, the printing mechanism accomplishes its printing movement and is succeeded by the operation of the punching mechanism which punches the tag just printed. As the punch or punches reach their lowest punching movement and hence their actuating electromagnets no longer require current, the pawl 192 begins its forward feeding movement, thereby moving the templet forward so as to insulate or move the fingers 231 to inoperative position. Thus the printing is accomplished just before the punching, as required for speed and accuracy, and the templet is halted or held stationary at the time the punching is being effected, the result being that there is no possibility of uncertainty as to the closing of the circuit at the templet which actuates the punching mechanism, but on the contrary the circuit closers 231 remain in circuit-closing position without any possibility of being disturbed for a relatively long interval as compared with the feeding interval, thereby insuring certainty of operation of the punches and precision of the punch holes with reference to the feeding of the blank. A further important advantage of this feature of the invention is that by having the templet held stationary or halted during the closing of the circuit which actuates the punches, a templet may be used having smaller holes than would be possible if the templet were continuously fed forward, and hence the templet and the tag can be identical as to the size and position of the holes. The tags are guided by a rear edge guide 266 adjustable in transverse slots 267 and a front edge guide 268 on the table 4.

In order to permit the machine to make one tag or a part of a tag or a series of tags at the will of the operator, I provide special parts and connections which render it possible to keep the machine continuously running, or to stop it upon the complete passage of one blank, or at any point in the passage of said blank. The driving pulley 27, loose upon its shaft 12, is connected thereto by clutch mechanism, comprising a disk 269 fast on said shaft 12 and provided with a dog 270 pivoted to said disk at 271 and normally tending to move outward by a spring 272 and pin 273 ready to engage notches 274 in a projecting flange 275 of the pulley 27 whenever released by a locking plunger 276. This locking plunger is held in the frame of the machine and limited in its movement by a pin 277 projecting therefrom into a slot 278 against which bears the upper free end 279 of an elbow lever whose lower end is provided with a projecting lug 280 in position to be engaged by a latch 281 pivoted at 282 on a lever 283 and normally held forward by a spring 284, said lever 283 being pivoted to the frame of the machine at 285 and connected at its free end to the treadle lever 43. The upper end of the latch 281 is in position to be tripped or moved to the right by a pin 286 on one end of an elbow lever 287 pivoted at 288 to the frame of the machine and provided at its other end with a pin 289 projecting in a slot 290 in a block 291, said slot being adjustable in length by a set screw 292. The block 291 is moved by a stem 293 projecting from the upper end of the core 294 of a solenoid 295.

A switch 296 (whose preferred position is shown in Fig. 1 but which can be placed at any point in the machine convenient to the hand of the operator) is connected to the main wire 158 by wire 297, see Fig. 20, and a wire 298 in which is interposed a switch controlled by the passage of a tag blank and comprising a stationary contact 299 and a pivoted contact 300 spring-held at 301 and projecting at its upper end in the path of the blanks, see Fig. 5. The switch 296 has an intermediate point 302, which is dead. A switch, shown as consisting of a stationary part 303 and a movable part 304, is connected to the switch 296 by a conductor 305, said switch being shown in Fig. 3 and the wiring in Fig. 20. The movable member 304 is connected by links 306, 307 adjustable at 308, to the elbow lever 279 before mentioned, and the stationary member 303 is connected by a conductor 309 to the solenoid 295. When, therefore, the switch 296 is moved into its forward position, Figs. 1 and 20, and the treadle rod 43 is depressed, Fig. 3, thereby pulling down the lug 280 at the lower end of the elbow lever 279, said elbow lever operates to retract the bolt or plunger 276 from the clutch so that the dog 270 instantly springs into engagement with the driving pulley and starts the machine. The further lowering of the treadle closes the switch 303, 304, thereby energizing the solenoid 295 which moves elbow lever 287 so as to hold the latch 281 out of restraining position with relation to the elbow lever 279, 280, thereby leaving the bolt or plunger 276 free to be shot forward by its spring 310, Fig. 4, ready to stop the machine at the end of one revolution. When the switch 296 is at its intermediate position 302, Fig. 20, and the treadle is lowered as before, the machine will remain in operation as long as the treadle is held down because the solenoid 295 remains inactive as its circuit is not completed. When the switch 296 is set at its third or extreme rear position and the treadle is depressed, thereby placing the solenoid 295 in closed-circuit position, the machine will be stopped as soon as the tag has passed through the machine so as to permit the automatic switch 299, 300 to close itself, said switch being held open by the tag while the latter is being fed through the machine. To guard against the possibility of an accident in the templet-feeding mechanism and particularly in overwinding the spring 208, I provide a switch or circuit-closer 311, 312 shown in Fig. 13 in position to be operated by a projecting rear end 313 of the pivoted lever 220, so that as the winding movement of the spring passes its normal limit, the consequent outward movement of said lever 220 operates to close the contacts 311, 312, thereby instantly operating the solenoid 295 to release the bolt or plunger 276 to uncouple the clutch and stop the machine. To guard against a rebound of the machine-connected clutch member 269, I provide a latch or auxiliary dog 314 pivoted at 271 and held yieldingly outward by a spring 315 so as to snap behind the bolt 276 the moment that the latter has withdrawn the dog 270 from engagement with the driving pulley. A further safety device is provided in the form of a solenoid 316 connected to operate the main circuit breaker 152 whenever the circuit closer 311, 312 is closed, thereby rendering it impossible for the operator to start the machine again by depressing the treadle until he has remedied the difficulty which operated to close the switch 311, 312. At 317 adjacent the printing mechanism I have pivoted a lever 318 by means of which the numbering device can be automatically shifted at the end of each revolution or shifted by hand when desired. For this purpose said lever is provided with a roll 319 to come into the path of a usual shifting device 320 such as is provided on numbering devices of the kind used in my machine, and said lever can either be moved down at the will of the operator by a handle 321 or held down by a set screw 322 in the end of an arm 323 projecting upwardly from said lever. Whenever the roll 319 strikes the shifting device 320, the counter is automatically moved forward without stopping the machine. As the machine is constructed always to stop the parts as shown in the drawings, the operator, by grasping the handle 321 of the lever 318 and pressing downwardly, can actuate the shifting device when the machine is stationary.

I have found that in practice the switch 212 is quite apt to get dulled or choked with the fiber from the cardboard of the templet as the latter is pulled along in sliding contact therewith, and accordingly, in order to maintain this important switch always active, I provide each templet at its rear extremity with a small section of abrading surface 324, see Fig. 21, which, as the templet is reciprocated past the contact maker 212, slightly scours the contact surface thereof at each passage, thereby cleaning it and keeping it in perfect condition.

In order to prepare the templets readily and accurately so as to control the machine in strict accordance with the feeding and other arrangements of the machine, I provide a hand control for the individual punches, including a gang of contact makers or switches conveniently located as indicated at 325, Fig. 1, there being one of these switches or contact makers for each electromagnet interposed in a connection 326, shown in Fig. 20 as connecting from the wire 149 to the wire 236. It will be understood that I have indicated these switches in conventional manner, although in practice I arrange them after the manner of a keyboard.

In use, let it be supposed that the first thing to be done is to prepare the templet, in accordance for example with the requirements for some new shoe order. The strip of cardboard, which is preferably perfectly plain (excepting that it contains the feed holes 145) has applied thereto a strip of thin paper 327 printed with the required data, as for example the prices to be paid for the work, or the details of the make-up of the shoe, or any other classification of items according to the work in hand. For instance in Fig. 21 I have indicated this thin strip of paper as having at 328 in one column the prices to be paid for edge trimming, it may be, at 329 in the next column the prices to be paid for heel scouring. The operator places the blank templet, with its attached printed strip of thin paper in the machine, having first rocked the inking roll 50 to the extreme left by turning its handles 330 down so as to give the yoke 51 and printing roll 50 as extreme a throw as possible, thereby carrying the inking roll out of inking relation with the printing mechanism 7, and then he shifts the controlling switch 296 to its first position in connection with the wire 297, Fig. 20, and then depresses those keys or switches 325 which connect with the punches that are to be operated. He then depresses the foot treadle, whereupon the feeding mechanism feeds the blank forward one step, halts the blank, and then the punches whose circuits have been closed by the switches 325 operate to punch out the items in the first column which are not required. The machine then comes to a halt. The operator then places his fingers upon the keys or switches 325 required for punching out those items indicated in the strip 327 which are not required in the next column for the given shoe order, depresses the treadle again, whereupon the paper is fed, halted, and punched in accordance with the particular punches controlled by the keys or switches depressed. As the machine comes to a halt the second time, the operator immediately depresses the keys 325 required in accordance with the third column of figures or items on the sheet 327, depresses the treadle, and the feeding and punching operations are repeated. This continues until the entire templet is made. It will be evident that this is accomplished with extreme rapidity, the operator soon becoming expert. Having completed the templet, the thin paper 327 is stripped from the templet (and kept at the office to show the various costs and make-up of the shoe, etc.) and the comparatively unintelligible templet itself, without any printing or other understandable data, is then ready for use by the regular operator who makes the regular tags. The operator who makes the templets is usually a confidential operator who alone is entrusted with the actual prices, etc., which cannot be known from the templet without the accompanying key or strip 327. The feeding, etc., when the templet is being made is exactly the same as when the tags are being made, having all the features of absolute precision, etc., as already explained. The continuously rotating presser roll or feed roll 15 (driven by the gears 21, 22 and shaft 23 from the belt pulley 26) is raised by the rocking of the shaft 17 under the influence of the crank 18 and cam lump 20 (adjustable as shown in Fig. 19 to change the length of feed according to the space required by any given size of punch or coupon), and at the same time the coöperating portion 7 of the feeding mechanism revolves, meeting the upper side of the tag or blank at the same time that the feed roll 15 meets the under side thereof, being driven directly by the shaft 12 and at the same time the hold-down 39 is raised from holding engagement with the blank by the lifter 47, raised by the lug 46 of the shaft 17. Let it be supposed now that the templet has been made and is in place in its raceway 139 in position to be fed forward. The instant that the blank on the table 4 has been fed forward the required distance as just explained, the presser foot 28 is lowered, thereby clamping the blank between it and the anvil 37 immovably under the action of the cam lump 34 against the roll 33 of the crank 32, which lowers the presser foot 28 through the crank 30. As herein arranged, the templet has come to a halt before the blank comes to a halt and is clamped, thereby insuring a sufficiently long contact between the fingers or contact makers 231 and the plate or stationary contact 239 to fully energize those magnets 118 whose punches are to be operated to punch holes in accordance with the holes in the templet. The blank having come to rest, the arm 131 is swung forward by the path cam 13 and lever 134 and carries with it those detents 115 which have been raised by the armatures pulled down by the electromagnets 118 which have been energized, the resulting forward movement of said detent and consequently of their elbow levers 111 serving to lower instantly and forcibly the desired punches.

Preferably while the punches are still down the templet is fed forward by the cam 14, lever 260, link 257 and pawl 192 so as to bring another set of controlling holes of the templet into circuit-closing position for repeating the process. The templet however arrives at this position preferably by two movements, the first simply moving the templet far enough to disengage the circuit-closing fingers 231 and insulate them by means of the interposed templet, while the punches are recovering their normal raised position, and then the templet moves forward another half space so as to bring the next row of controlling holes into circuit-closing position, permitting the fingers 231 to close the circuit as before. The feeding and printing movement then takes place again (it being understood that in order to permit the feeding mechanism to become a printing mechanism, the handle 330 has been swung upwardly so as to move the inking roller 50 back into position to ink the printing mechanism 7 as it revolves). If the tag being printed and punched is a combination tag such as a shop order and price tag united in one, the hand switch 296 is in its third position, closing contact with the conductor 298 so that the printing and punching proceed continuously and rapidly until the entire price or coupon portion of the tag is printed and punched, whereupon the tail end of the swinging trip or contact 300 swings upwardly through a hole provided in the blank at the end of the price portion or section of the tag, thereby completing the circuit at 299, see Fig. 20, which, through the switch 296 and the solenoid 295, bell crank 287, arm 281, releases lever 279, permitting the plunger 276 to spring forward and stop the machine. At the same instant that the trip or spring switch 300 stops the machine and hence stops further punching, the templet is instantly restored to its original position by the closing of the contact 212 behind it, which energizes the circuit of the solenoid 156, thereby pulling in its core 166 and releasing the dogs 192, 193, from their ratchet wheel so as to permit the helical spring 208 to reversely rotate the drum 202 so as to feed the templet backward until stopped by the engagement of dog 229 with the notch 230, Fig. 15. Just before the templet begins to move back, the contact fingers 231 are moved out of possible interference with the backward movement of the templet by the rocking of their supporting shaft 234 under the influence of the crank 243, link 245, arm 246 and connections therefrom to the core 166. Also whenever a templet is not in the machine the fingers 231 are held back in said entirely inoperative position through these same connections. When the door or front wall 141 is down the switch 147 is maintained open, thereby cutting out all the templet controlling or pattern mechanism, and the same is true even when the door is closed provided a templet is not in place, thereby preventing any possibility of this controlling portion of the machine operating without a templet. In case of accident the safety switch 311, 312, operates to stop the entire machine. When the templet reaches its returned position, dogs 192, 193, are restored to operative position for again feeding a templet forward. If ordinary price or coupon tags were being printed or punched the templet would now immediately proceed forward again for making another tag upon depressing the treadle, and when said second tag was finished the templet would again be automatically restored and started forward by depressing the treadle, a third time, for making a third tag, and so on, operating as rapidly as the operator could feed the blanks and depress the treadle. But in making the combination tag under consideration, the machine automatically stops at the end of the coupon or price portion of the tags and then, the templet having been restored as explained, the operator pulls out the handle, herein shown as a nut 331 mounted loosely on an adjusting rod 332 of the solenoid 156, thereby pulling the core 166 thereof inwardly against the spring 179, and as soon as said handle or nut has been moved beyond a stationary pin 333, see Fig. 13, it is turned over said pin, thereby holding the core in said retracted position. This maintains the dogs 192, 193, permanently out of possible engagement with their ratchet, thereby rendering the templet and its operating mechanism inoperative for the time being, so as to permit any intermediate printing or feeding between a series of punching operations. The hand switch 296 is moved into contact with wire 297 or into its first position toward the front of the machine, thereby causing the machine to stop at the end of each revolution. As the treadle rises, the lever 44 and rod 42 lift the hold-down 39 from the blank so as to permit the operator to feed the blank forward to the next section or division thereof, as for instance the one marked "vamps," whereupon the treadle is depressed, thereby starting the machine and the printing mechanism so that the case number, pairs and sheet number of the tag are printed on that division. The machine halts after this single printing, the operator feeds the blank forward by hand to the next division, as for instance "linings," the treadle is again depressed printing the same case number, pairs and sheet number on this division, and the process is repeated for each division of the tag until the entire combination tag is finished. Having finished one combination tag the next tag of the same kind is put into the machine, the next case number is brought into position by depressing the lever 321, Fig. 1, and thereafter the tag is made the same as already explained for the preceding tag, the automatic rapid printing and punching of the price or coupon section of the tag being brought into action by turning the handle or thumb nut 331 from its raised position to its lowered position on the pin 333 so as to restore the adjacent parts of the templet operating mechanism to normal position in order to permit the templet and hence the punching mechanism to be operated automatically.

Ordinarily when several shop order tags alone are to be prepared, the templet is omitted, as the most convenient means of rendering the punching mechanism inoperative. On the other hand, if it is desired to make a shop order tag and then its separate coupon or price tag, then the next shop order tag and its coupon or price tag and so on, the templet is left in the machine but rendered inoperative each time the shop order tag is being made and rendered operative each time the corresponding coupon or price tag is being made, this being accomplished by means of the handle or thumb nut 331 as explained. When it is desired to make a series of shop order tags, for example, each having the same sheet number and pairs, for instance, but successive case numbers and to make them rapidly, instead of changing the case numbers by operating the lever 321 by hand, said lever is held down continuously by the thumb screw 322, whereupon the case number is changed automatically at each printing operation.

One object of my machine is to combine accuracy with great rapidity, this being of importance in connection with large shoe factories where sometimes many hundreds of tags have to be made out every day, and accordingly I consider as important that feature of my invention which permits the numbering and printing to proceed during and as a part of the forward feeding of the tag, the tag being halted intermittingly to permit the separate punching operations. There is no lost time. Also the templet is always ready to proceed or to repeat its operation. A further valuable feature tending to promote accuracy resides in having the blank positively held at all times either by the feed roll or the clamping mechanism, the hold-down dropping in holding contact with the blank the moment that the feed roll moves down.

The punching mechanism is not only removable as a whole for adjustment, etc., but the individual punches are separately adjustable on their supports 108 and 127 for the requirements of different tags and factories. The punching mechanism is adjusted longitudinally for different longitudinal spacing of the punched holes by the adjusting means 129, 130, 132—136, which adjusts the entire punching mechanism as a whole. The machine is capable of punching and printing or of punching without printing or of printing without punching, according to the will of the operator. It may be set to operate once and stop or to operate until the tag is finished or to operate according to the will of the operator. The clutch is under electrical control and also treadle control. To vary the feed of the templet, the lever 257 is moved along the arm 260 (the thumb nut 258 being loosened to permit the requisite sliding movement in the groove 259). This correspondingly swings the pawl carrier 256 with its pawl 192. The members 183, 188 and 190 are turned on the shaft 182, if necessary in order to maintain their proper relation to said pawl, by first loosening the bolts 185 and 191. If necessary, in order to maintain the second pawl 193 in position to engage the edge of the plate 188, said pawl and its carrier are also adjusted.

Having described my invention, what I claim as new and desire to secure by Letters Patent is:

1. A machine of the kind described, comprising punching mechanism to feed a card, including a series of independently operable punches, automatic means to control the operation of the punches in a predetermined order of succession throughout the length of the card, and means automatically to repeat a given order of punching.

2. A machine of the kind described, comprising punching mechanism to feed a card, including a series of independently operable punches, automatic means to control the operation of the punches in a predetermined order of succession throughout the length of the card, means automatically to repeat a given order of punching, and means to continue or discontinue the latter at the will of the operator.

3. A machine of the kind described, comprising punching mechanism to operate on a card, including a series of independently operable punches, combined with controlling mechanism, including a templet, to control the order of operation of said independent punches, means to feed said templet forward during a progressive series of punching operations, and retracting means to bring the templet back to starting position for a new series of punching operations.

4. A machine of the kind described, comprising punching mechanism to operate on a card, including a series of independently operable punches, combined with controlling mechanism, including a templet, to control the order of operation of said independent punches, means to feed said templet slowly forward during a progressive series of punching operations, and means to shift said templet back rapidly to starting position at the end of said series of punching operations.

5. A machine of the kind described, comprising punching mechanism to operate on a card, including a series of independently operable punches, combined with controlling mechanism, including a templet, to control the order of operation of said independent punches, means to feed said templet slowly forward during a progressive series of punching operations, and automatic means to shift said templet back rapidly to starting position automatically at the end of said series of punching operations.

6. A machine of the kind described, comprising step by step mechanism to operate on a card as it is fed through the machine, said mechanism including a series of independently movable parts, means to vary the effective relation of said parts to the card for given operations of said step by step mechanism, coöperating mechanism to feed a card step by step, and a hold-down normally pressing on the card to prevent accidental movement thereof.

7. A machine of the kind described, comprising step by step mechanism to operate on a card as it is fed through the machine, said mechanism including a series of independently movable parts, means to vary the effective relation of said parts to the card for given operations of said step by step mechanism, coöperating mechanism to feed a card step by step, a hold-down normally pressing on the card to prevent accidental movement thereof, and manually-controlled means to start the feeding mechanism, provided with means to raise said hold-down when the feeding mechanism is ready to feed the card.

8. A machine of the kind described, comprising step by step mechanism to operate on a card as it is fed through the machine, said mechanism including a series of independently movable parts, means to vary the effective relation of said parts to the card for given operations of said step by step mechanism, coöperating mechanism to feed a card step by step, and an automatic clamping device to clamp the card immovably at the end of each feeding operation.

9. A machine of the kind described, comprising step by step mechanism to operate on a card as it is fed through the machine, said mechanism including a series of independently movable parts, means to vary the effective relation of said parts to the card for given operations of said step by step mechanism, coöperating mechanism to feed a card step by step, an automatic clamping device to clamp the card immovably at the end of each feeding operation, and means operating in timed relation to the feeding operation to release said clamping device from the card during the feeding of the latter and to move said device to clamping position the instant the feeding movement ceases.

10. A machine of the kind described, comprising step by step mechanism to operate on a card as it is fed through the machine, said mechanism including a series of independently movable parts, means to vary the effective relation of said parts to the card for given operations of said step by step mechanism, coöperating mechanism to feed a card step by step, an automatic clamping device to clamp the card immovably at the end of each feeding operation, and a hold-down normally in frictional engagement with the card permitting the card to be fed and restraining it from improper movement.

11. A machine of the kind described, comprising step by step mechanism to operate on a card as it is fed through the machine, said mechanism including a series of independently movable parts, means to vary the effective relation of said parts to the card for given operations of said step by step mechanism, coöperating mechanism to feed a card step by step, and an automatic clamping device, including a presser foot vertically movable over the bed of the machine, and means to vary the operation of said clamping device to stop the work at the instant the feeding movement ceases.

12. A machine of the kind described, comprising step by step mechanism to operate on a card as it is fed through the machine, said mechanism including a series of independently movable parts, means to vary the effective relation of said parts to the card for given operations of said step by step mechanism, coöperating mechanism to feed a card step by step, an automatic clamping device, including a presser foot vertically movable over the bed of the machine, and means to vary the operation of said clamping device to stop the work at the instant the feeding movement ceases, and a hold-down normally in engagement with the work, and means to release said hold-down from the work the moment the feeding of the latter begins.

13. A machine of the kind described, comprising step by step mechanism to operate on a card as it is fed through the machine, said mechanism including a series of independently movable parts, means to vary the effective relation of said parts to the card for given operations of said step by step mechanism, coöperating mechanism to feed a card step by step, an automatic clamping device, including a bifurcated presser foot vertically movable over the bed of the machine, and means to vary the operation of said clamping device to stop the work at the instant the feeding movement ceases, and a hold-down normally in engagement with the work between the parts of the bifurcated presser foot, and means to release said hold-down from the work the moment the feeding of the latter begins.

14. A machine of the kind described, comprising step by step mechanism to operate on a card as it is fed through the machine, said mechanism including a series of independently movable parts, means to vary the effective relation of said parts to the card for given operations of said step by step mechanism, and automatic stopping means to stop the machine after one operation on the card.

15. A machine of the kind described, comprising step by step mechanism to operate on a card as it is fed through the machine, said mechanism including a series of independently movable parts, means to vary the effective relation of said parts to the card for given operations of said step by step mechanism, and manually controlled stopping means to stop the machine after any operation on the card.

16. A machine of the kind described, comprising step by step mechanism to operate on a card as it is fed through the machine, said mechanism including a series of independently movable parts, means to vary the effective relation of said parts to the card for given operations of said step by step mechanism, and automatic stopping means to stop the machine after a predetermined series of operations on the card.

17. A machine of the kind described, comprising step by step mechanism to operate on a card as it is fed through the machine, said mechanism including a series of independently movable parts, means to vary the effective relation of said parts to the card for given operations of said step by step mechanism, and automatic stopping means controlled by the card in the machine to stop the machine after a predetermined series of operations on the card.

18. A machine of the kind described, comprising step by step mechanism to operate on a card as it is fed through the machine, said mechanism including a series of independently movable parts, means to vary the effective relation of said parts to the card for given operations of said step by step mechanism, and manually controlled stopping means to stop the machine after one operation on the card.

19. A machine of the kind described, comprising step by step mechanism to operate on a card as it is fed through the machine, said mechanism including a series of independently movable parts, means to vary the effective relation of said parts to the card for given operations of said step by step mechanism, and stopping mechanism including an automatic stop in the path of the card.

20. A machine of the kind described, comprising step by step mechanism to operate on a card as it is fed through the machine, said mechanism including a series of independently movable parts, means to vary the effective relation of said parts to the card for given operations of said step by step mechanism, and stopping mechanism including an automatic stop in the path of the card held in inoperative position by the engagement of the card therewith.

21. A machine of the kind described, comprising step by step mechanism to operate on a card as it is fed through the machine, said mechanism including a series of independently movable parts, means to vary the effective relation of said parts to the card for given operations of said step by step mechanism, and automatic stopping mechanism including manual controlling means operable to set said mechanism to stop the machine at the end of one operation on the card or at the end of a series of operations on the card, as desired.

22. A machine of the kind described, comprising step by step mechanism to operate on a card as it is fed through the machine, said mechanism including a series of independently movable parts, means to vary the effective relation of said parts to the card for given operations of said step by step mechanism, and automatic stopping mechanism including manual controlling means operable to set said mechanism to stop the machine at the end of one operation on the card or at the end of a series of operations on the card or indefinitely, as desired.

23. A machine of the kind described, comprising step by step mechanism to operate on a card as it is fed through the machine, said mechanism including a series of independently movable parts, means to vary the effective relation of said parts to the card for given operations of said step by step mechanism, manual starting and stopping mechanism, and automatic stopping mechanism rendered effective by said manual mechanism, including controlling means having two positions for stopping the machine respectively at different intervals of operation, whereby the machine when started is subject to be stopped by said automatic stopping mechanism and also at the will of the operator by said manual stopping mechanism.

24. A machine of the kind described, comprising step by step mechanism to operate on a card as it is fed through the machine, said mechanism including a series of independently movable parts, means to vary the effective relation of said parts to the card for given operations of said step by step mechanism, manual starting and stopping mechanism, automatic stopping mechanism rendered effective by said manual mechanism, including controlling means having two positions for stopping the machine respectively at different intervals of operation, and automatic stopping means, controlled by the card being operated upon, coöperating with said controlling means in one of its said positions.

25. A machine of the kind described, comprising step by step mechanism to operate on a card as it is fed through the machine, said mechanism including a series of independently movable parts, means to vary the effective relation of said parts to the card for given operations of said step by step mechanism, including automatic controlling means to control said variation in accordance with a predetermined schedule, and automatic stopping means to stop the machine when said controlling means works improperly.

26. A machine of the kind described, comprising step by step mechanism to operate on a card as it is fed through the machine, said mechanism including a series of independently movable parts, means to vary the effective relation of said parts to the card for given operations of said step by step mechanism, including automatic controlling means to control said variation in accordance with a predetermined schedule, and automatic stopping means to stop the machine at the completion of the control in accordance with said schedule.

27. A machine of the kind described, comprising step by step mechanism to operate on a card as it is fed through the machine, said mechanism including a series of independently movable parts, means to vary the effective relation of said parts to the card for given operations of said step by step mechanism, including automatic controlling means to control said variation in accordance with a predetermined schedule, and automatic means to restore to starting position again the said controlling means at the end of a given controlling movement.

28. A machine of the kind described, comprising mechanism to operate on a card at intervals throughout the length of the latter, said operating mechanism including a series of independently movable parts, automatic controlling mechanism to control the operation of said individual parts, including a templet, means for supporting said templet in operative position, and means rendering said controlling mechanism operative when the templet is in position and inoperative when the templet is not in position.

29. A machine of the kind described, comprising mechanism to operate on a card at intervals throughout the length of the latter, said operating mechanism including a series of independently movable parts, automatic controlling mechanism to control the operation of said individual parts, including a templet, means for supporting said templet in operative position, and automatic means rendering said controlling mechanism operative when the templet is in position and inoperative when the templet is not in position.

30. A machine of the kind described, comprising mechanism to operate on a card at intervals throughout the length of the latter, said operating mechanism including a series of independently movable parts, automatic controlling mechanism to control the operation of said individual parts, including a templet, means for supporting said templet in operative position provided with a movable door, and coöperating means rendering said controlling mechanism inoperative when the door is open.

31. A machine of the kind described, comprising mechanism to operate on a card at intervals throughout the length of the latter, said operating mechanism including a series of independently movable parts, automatic controlling mechanism to control the operation of said individual parts, including a templet, means for supporting said templet in operative position provided with a movable door, and coöperating means rendering said controlling mechanism inoperative when the door is open or a templet is absent.

32. A machine of the kind described, comprising mechanism to operate on a card at intervals throughout the length of the latter, said operating mechanism including a series of independently movable parts, automatic controlling mechanism to control the operation of said individual parts, including a templet, a series of independently movable members actuated by said templet, and connections therefrom to said independently movable parts to control the movement of the latter in accordance with the movement of said members.

33. A machine of the kind described, comprising mechanism to operate on a card at intervals throughout the length of the latter, said operating mechanism including a series of independently movable parts, automatic controlling mechanism to control the operation of said individual parts, including a templet, a series of independently movable members actuated by said templet, means for relatively feeding said templet and members, and connections from said members to said parts for controlling the movement of the parts in accordance with the movement of the members.

34. A machine of the kind described, comprising mechanism to operate on a card at intervals throughout the length of the latter, said operating mechanism including a series of independently movable parts, automatic controlling mechanism to control the operation of said individual parts, including a templet, a series of independently movable members actuated by said templet, means for relatively feeding said templet and members, connections from said members to said parts for controlling the movement of the parts in accordance with the movement of the members, and means to restore that one of said relatively feeding mechanisms so fed, to starting position at the end of the feeding movement.

35. A machine of the kind described, comprising mechanism to operate on a card at intervals throughout the length of the latter, said operating mechanism including a series of independently movable parts, automatic controlling mechanism to control the operation of said individual parts, including a templet, means to feed said templet forward and to restore the same, including a spring, winding mechanism for said spring actuated by said feeding operation, and releasing means to permit said spring to restore the templet.

36. A machine of the kind described, comprising mechanism to operate on a card at intervals throughout the length of the latter, said operating mechanism including a series of independently movable parts, automatic controlling mechanism to control the operation of said individual parts, including a templet, means to feed said templet forward and to restore the same, including a spring, winding mechanism for said spring actuated by said feeding operation, and automatic releasing means to permit said spring to restore the templet.

37. A machine of the kind described, comprising mechanism to operate on a card at intervals throughout the length of the latter, said operating mechanism including a series of independently movable parts, automatic controlling mechanism to control the operation of said individual parts, including a templet, means to feed said templet forward and to restore the same, including a spring, winding mechanism for said spring actuated by said feeding operation, and automatic releasing means actuated by the templet to permit said spring to restore the templet.

38. A machine of the kind described, comprising mechanism to operate on a card at intervals throughout the length of the latter, said operating mechanism including a series of independently movable parts, automatic controlling mechanism to control the operation of said individual parts, including a templet, an inclosing track for said templet, and feeding mechanism to propel said templet in said track.

39. A machine of the kind described, comprising mechanism to operate on a card at intervals throughout the length of the latter, said operating mechanism including a series of independently movable parts, automatic controlling mechanism to control the operation of said individual parts, including a templet, an inclosing track for said templet, said templet having feeding perforations extending lengthwise thereof, a feed device having projections to engage said perforations, and mechanism to actuate said feed device to propel said templet in said track.

40. A machine of the kind described, comprising mechanism to operate on a card at intervals throughout the length of the latter, said operating mechanism including a series of independently movable parts, automatic controlling mechanism to control the operation of said individual parts, including a templet, a track for the templet to travel in, means engaging the templet to move it forward, a pawl and ratchet mechanism to actuate said moving means, and means controlled by the templet to render said pawl and ratchet mechanism operative.

41. A machine of the kind described, comprising mechanism to operate on a card at intervals throughout the length of the latter, said operating mechanism including a series of independently movable parts, automatic controlling mechanism to control the operation of said individual parts, including a templet, a track for the templet to travel in, means engaging the templet to move it forward, a pawl and ratchet mechanism to actuate said moving means, and means controlled by the templet to render said pawl and ratchet mechanism inoperative.

42. A machine of the kind described, comprising mechanism to operate on a card at intervals throughout the length of the latter, said operating mechanism including a series of independently movable parts, automatic controlling mechanism to control the operation of said individual parts, including a templet, a track for the templet to travel in, means engaging the templet to move it forward, a pawl and ratchet mechanism to actuate said moving means, a spring to reverse the movement of said moving means, adapted to be placed under tension by the feeding movement of said pawl and ratchet mechanism, and disconnecting means controlled by the templet to disconnect said pawl and ratchet and thereby permit said spring to restore the templet for a forward feeding movement of the latter.

43. A machine of the kind described, comprising mechanism to operate on a card at intervals throughout the length of the latter, said operating mechanism including a series of independently movable parts, automatic controlling mechanism to control the operation of said individual parts, including a templet, a track for the templet to travel in, means engaging the templet to move it forward, a pawl and ratchet mechanism to actuate said moving means, a spring to reverse the movement of said moving means, adapted to be placed under tension by the feeding movement of said pawl and ratchet mechanism, disconnecting means controlled by the templet to disconnect said pawl and ratchet and thereby permit said spring to restore the templet for a forward feeding movement of the latter, and means to limit the return movement of said spring in accordance with the normal starting position of the templet.

44. A machine of the kind described, comprising mechanism to operate on a card at intervals throughout the length of the latter, said operating mechanism including a series of independently movable parts, automatic controlling mechanism to control the operation of said individual parts, including a templet, mechanism to feed the templet forward and to retract the templet, including a ratchet, a pawl, a retracting spring, a locking dog controlled by the templet to lock said pawl in inoperative position, and means to put the dog in inoperative position.

45. A machine of the kind described, comprising mechanism to operate on a card at intervals throughout the length of the latter, said operating mechanism including a series of independently movable parts, automatic controlling mechanism to control the operation of said individual parts, including a templet, mechanism to feed the templet forward and to retract the templet, including a ratchet, a pawl, a retracting spring, a locking dog controlled by the templet in its forward position to lock said pawl in inoperative position, and means to put the dog in inoperative position.

46. A machine of the kind described, comprising mechanism to operate on a card at intervals throughout the length of the latter, said operating mechanism including a series of independently movable parts, automatic controlling mechanism to control the operation of said individual parts, including a templet, mechanism to feed the templet forward and to retract the templet, including a ratchet, a pawl, a retracting spring, a helical way moved by said spring, means traveling in said way, means to stop the retracting movement of the spring at a predetermined point, said means being rendered inoperative by the movement of said traveling means in one direction, and rendered operative by an opposite movement of said traveling means.

47. A machine of the kind described, comprising mechanism to operate on a card at intervals throughout the length of the latter, said operating mechanism including a series of independently movable parts, automatic controlling mechanism to control the operation of said individual parts, including a templet, mechanism to feed the templet forward and to retract the templet, including a ratchet, a pawl, a retracting spring, a helical way moved by said spring, means traveling in said way, a locking dog actuated through the agency of said traveling means, and means controlled by said locking dog to hold said pawl out of engagement with said ratchet to permit the templet to be retracted by said spring.

48. A machine of the kind described, comprising mechanism to operate on a card at intervals throughout the length of the latter, said operating mechanism including a series of independently movable parts, automatic controlling mechanism to control the operation of said individual parts, including a templet, mechanism to feed the templet forward and to retract the templet, including a ratchet, a pawl, a retracting spring, means to wind said spring as the templet is fed forward, means to permit said spring to retract the templet at the end of the forward feeding movement, and means to stop the spring positively when the templet has returned to its starting position.

49. A machine of the kind described, comprising mechanism to operate on a card at intervals throughout the length of the latter, said operating mechanism including a series of independently movable parts, automatic controlling mechanism to control the operation of said individual parts, including a templet, mechanism to feed the templet forward and to retract the templet, including a ratchet, a pawl, a retracting spring, means to wind said spring as the templet is fed forward, means to permit said spring to retract the templet at the end of the forward feeding movement, and means to restore said pawl instantly to operative relation with its ratchet when the templet has been restored to starting position.

50. A machine of the kind described, comprising mechanism to operate on a card at intervals throughout the length of the latter, said operating mechanism including a series of independently movable parts, automatic controlling mechanism to control the operation of said individual parts, including a templet, mechanism to feed the templet forward and to retract the templet, including a ratchet, a pawl, a retracting spring, means to wind said spring as the templet is fed forward, means to permit said spring to retract the templet at the end of the forward feeding movement, a lever to hold said pawl out of operative engagement when the templet is being retracted, a locking dog to lock said lever in said holding position, and means to automatically release said locking dog when the templet has been restored to starting position.

51. A machine of the kind described, comprising mechanism to operate on a card at intervals throughout the length of the latter, said operating mechanism including a series of independently movable parts, automatic controlling mechanism to control the operation of said individual parts, including a templet, mechanism to feed the templet forward and to retract the templet, including a ratchet, a pawl, a retracting spring, means to wind said spring as the templet is fed forward, means to permit said spring to retract the templet at the end of the forward feeding movement, a lever to hold said pawl out of operative engagement when the templet is being retracted, a locking dog to lock said lever in said holding position, and means to automatically release said locking dog when the templet has been restored to starting position, including a spring-held lever, and a position, including a spring-holder, and a shouldered rotary member to be engaged by said lever which is permitted by the shoulder thereof to spring into position to release said locking dog.

52. A machine of the kind described, comprising mechanism to operate on a card at intervals throughout the length of the latter, said operating mechanism including a series of independently movable parts, automatic controlling mechanism to control the operation of said individual parts, including a templet, mechanism to feed the templet forward and to retract the templet, including a ratchet, a pawl, a retracting spring, means to wind said spring as the templet is fed forward, means to permit said spring to retract the templet at the end of the forward feeding movement, a lever to hold said pawl out of operative engagement when the templet is being retracted, a locking dog to lock said lever in said holding position, and means to automatically release said locking dog when the templet has been restored to starting position, including a helical way, a spring-held lever, means traveling in said way to move said lever against its spring in one direction and in another direction to permit said lever-spring to move said lever in a direction to release said dog.

53. A machine of the kind described, comprising mechanism to operate on a card at intervals throughout the length of the latter, said operating mechanism including a series of independently movable parts, automatic controlling mechanism to control the operation of said individual parts, including a templet, electrical actuating means for each of said individual parts, and selective means actuated in accordance with the templet to operate said electric means.

54. A machine of the kind described, comprising mechanism to operate on a card at intervals through the length of the latter, said operating mechanism including a series of independently movable parts, automatic controlling mechanism to control the operation of said individual parts, including a templet, electric actuating means for each of said individual parts, and selective means, including a circuit and circuit closer for each of said electrically actuated means, responsive in accordance with said templet.

55. A machine of the kind described, comprising mechanism to operate on a card at intervals throughout the length of the latter, said operating mechanism including a series of independently movable parts, automatic controlling mechanism to control the operation of said individual parts, including a templet, electrical actuating means for each of said individual parts, and selective means to govern said actuating means, including contacts, contact makers, and their circuits for said respective actuating means, said templet having provision for making and breaking the respective circuits by its movement.

56. A machine of the kind described, comprising mechanism to operate on a card at intervals throughout the length of the latter, said operating mechanism including a series of independently movable parts, automatic controlling mechanism to control the operation of said individual parts, including a templet, electrical actuating means for each of said individual parts, a series of pivoted contact makers on one side of said templet adapted to close the circuit through the templet, and coöperating circuit-closing means on the opposite side of the templet.

57. A machine of the kind described, comprising mechanism to operate on a card at intervals throughout the length of the latter, said operating mechanism including a series of independently movable parts, automatic controlling mechanism to control the operation of said individual parts, including a templet, electrical actuating means for each of said individual parts, a series of pivoted contact makers on one side of said templet adapted to close the circuit through the templet, coöperating circuit-closing means on the opposite side of the templet, means to feed the templet forward, and means to maintain all of the circuit-closing devices separated and out of interference with the templet when the latter is being placed in starting position.

58. A machine of the kind described, comprising mechanism to operate on a card at intervals throughout the length of the latter, said operating mechanism including a series of independently movable parts, automatic controlling mechanism to control the operation of said individual parts, including a templet, electrically controlled means responsive to said templet for independently operating said individual parts, and electrically controlled means responsive to said templet to feed the templet forward.

59. A machine of the kind described, comprising mechanism to operate on a card at intervals throughout the length of the latter, said operating mechanism including a series of independently movable parts, automatic controlling mechanism to control the operation of said individual parts, including a templet, electrically controlled means responsive to said templet for independently operating said individual parts, electrically controlled means responsive to said templet to feed the templet forward, and electrically controlled means responsive to said templet to restore the templet to starting position after it has been fed forward.

60. A machine of the kind described, comprising mechanism to operate on a card at intervals throughout the length of the latter, said operating mechanism including a series of independently movable parts, automatic controlling mechanism to control the operation of said individual parts, including a templet, electrically controlled means responsive to said templet for independently operating said individual parts, a solenoid normally stationary, a spring-projected core therefor, a pawl and ratchet brought into operative relation by movement of said solenoid, and templet-feeding mechanism operated by said pawl and ratchet.

61. A machine of the kind described, comprising mechanism to operate on a card at intervals throughout the length of the latter, said operating mechanism including a series of independently movable parts, automatic controlling mechanism to control the operation of said individual parts, including a templet, electrically controlled means responsive to said templet for independently operating said individual parts, a solenoid and its circuit, a movable support for said solenoid, a spring-projected core for said solenoid, the energizing of the solenoid moving the latter and its support on said core and thereby placing said spring under tension, means operated by the movement of said support to break the circuit of said solenoid, coöperating means to lock said support and solenoid in their moved position, a pawl and ratchet operatively connected to said core, and a templet-feeding device actuated by said pawl and ratchet.

62. A machine of the kind described, comprising mechanism to operate on a card at intervals throughout the length of the latter, said operating mechanism including a series of independently movable parts, automatic controlling mechanism to control the operation of said individual parts, including a templet, electrically controlled means responsive to said templet for independently operating said individual parts, a solenoid and its circuit, a movable support for said solenoid, a spring-projected core for said solenoid, the energizing of the solenoid moving the latter and its support on said core and thereby placing said spring under tension, a switch in the circuit of said solenoid having a switch lever pivoted on said support and provided with a detent to engage a relatively fixed part when said support and solenoid are moved and thereby break the circuit and deënergize the solenoid, a pawl and ratchet operatively connected to said core, and a templet-feeding device actuated by said pawl and ratchet.

63. A machine of the kind described, comprising mechanism to operate on a card at intervals throughout the length of the latter, said operating mechanism including a series of independently movable parts, automatic controlling mechanism to control the operation of said individual parts, including a templet, electrically controlled means responsive to said templet for independently operating said individual parts, a solenoid and its circuit, a movable support for said solenoid, a spring-projected core for said solenoid, the energizing of the solenoid moving the latter and its support on said core and thereby placing said spring under tension, a switch in the circuit of said solenoid having a switch lever pivoted on said support and provided with a detent to engage a relatively fixed part when said support and solenoid are moved and thereby break the circuit and deënergize the solenoid, a pawl and ratchet operatively connected to said core, a templet-feeding device actuated by said pawl and ratchet, and a tappet in the path of said switch lever for releasing the detent thereof from said relatively fixed part to permit the solenoid and its support to be restored to their original position.

64. A machine of the kind described, comprising. mechanism to operate on a card at intervals throughout the length of the latter, said operating mechanism including a series of independently movable parts, automatic controlling mechanism to control the operation of said individual parts, including a templet, electrically controlled means responsive to said templet for independently operating said individual parts, a solenoid and its circuit, a movable support for said solenoid, a spring-projected core for said solenoid, the energizing of the solenoid moving the latter and its support on said core and thereby placing said spring under tension, a switch in the circuit of said solenoid having a switch lever pivoted on said support and provided with a detent to engage a relatively fixed part when said support and solenoid are moved and thereby break the circuit and deënergize the solenoid, a pawl and ratchet operatively connected to said core, a templet-feeding device actuated by said pawl and ratchet, and electrically controlled automatic retracting means responsive to the templet when fed into its forward position for restoring the templet to its original position.

65. A machine of the kind described, comprising mechanism to operate on a card at intervals throughout the length of the latter, said operating mechanism including a series of independently movable parts, automatic controlling mechanism to control the operation of said individual parts, including a templet, and actuating mechanism to coöperate therewith, and means operable at the will of the operator to halt temporarily the templet-controlled mechanism to permit intermediate operations on the card between templet-controlled operations.

66. A machine of the kind described, comprising mechanism to operate on a card here and there throughout its length, including a series of independently movable parts, controlling mechanism to control the operation of said individual parts, including a templet, feeding mechanism for actuating said templet step by step, and means for varying the length of said steps.

67. A machine of the kind described, comprising mechanism to operate on a card here and there throughout its length, including a series of independently movable parts, controlling mechanism to control the operation of said individual parts, including a templet, pawl and ratchet feeding mechanism for said templet, and means for varying the effective movement of said pawl.

68. A machine of the kind described, comprising mechanism to operate on a card here and there throughout its length, including a series of independently movable parts, controlling mechanism to control the operation of said individual parts, including a templet, pawl and ratchet feeding mechanism for said templet, and means for engaging and disengaging said pawl and ratchet, including two relatively movable pivoted plates, one plate having a radial slot and the other an oblique slot, and a third plate provided with a pin fitting in said two slots and actuated by the relative movement of the two slotted plates and having a portion adapted to engage the pawl when moved outwardly and to disengage the pawl when moved inwardly.

69. A machine of the kind described, comprising mechanism to operate on a card here and there throughout its length, including a series of independently movable parts, controlling mechanism to control the operation of said individual parts, including a templet, pawl and ratchet feeding mechanism for said templet, means for engaging and disengaging said pawl and ratchet, including two relatively movable pivoted plates, one plate having a radial slot and the other an oblique slot, and a third plate provided with a pin fitting in said two slots and actuated by the relative movement of the two slotted plates and having a portion adapted to engage the pawl when moved outwardly and to disengage the pawl when moved inwardly, means for varying the radial position of said pawl with relation to the ratchet, and means permitting said pivoted plates to be adjusted in accordance with the radial position of said pawl.

70. A machine of the kind described, comprising mechanism to operate on a card at intervals throughout the length of the latter, said operating mechanism including a series of independently movable parts, automatic controlling mechanism to control the operation of said individual parts, including a templet, a track for the templet to travel in, means engaging the templet to move it forward, a pawl and ratchet mechanism to actuate said moving means, a spring to reverse the movement of said moving means, adapted to be placed under tension by the feeding movement of said pawl and ratchet mechanism, and disconnecting means to disconnect said pawl and ratchet and thereby permit said spring to restore the templet for a forward feeding movement of the latter.

71. A machine of the kind described, comprising mechanism to operate on a card at intervals throughout the length of the latter, said operating mechanism including a series of independently movable parts, automatic controlling mechanism to control the operation of said individual parts, including a templet, actuating mechanism to coöperate with said templet, and manually controlled means independent of the templet to halt the control of said controlling mechanism on the card operating mechanism.

72. A machine of the kind described, comprising mechanism to operate on a card here and there throughout its length, including a plurality of independently movable parts, controlling mechanism to control the operation of said individual parts in accordance with a predetermined schedule, and means under the control of the operator to cause said controlling mechanism to repeat any desired portion of the preceding operations on the card.

In testimony whereof, I have signed my name to this specification, in the presence of two subscribing witnesses.

CHARLES H. NICHOLS.

Witnesses:
EDWARD MAXWELL,
M. J. SPALDING.

It is hereby certified that in Letters Patent No. 1,105,995, granted August 4, 1914, upon the application of Charles H. Nichols, of Haverhill, Massachusetts, for an improvement in "Factory Tag or Ticket Making Apparatus," an error appears in the printed specification requiring correction as follows: Page 16, lines 114–115, strike out the words and commas "and a position, including a spring-holder,"; and that the said Letters Patent should be read with this correction therein that the same may conform to the record of the case in the Patent Office.

Signed and sealed this 1st day of December, A. D., 1914.

[SEAL.]

R. F. WHITEHEAD,
*Acting Commissioner of Patents.*